May 23, 1933.   J. NEWSOME   1,910,931
BOTTLE CLEANSING AND WASHING MACHINE
Filed Feb. 18, 1932   3 Sheets-Sheet 1
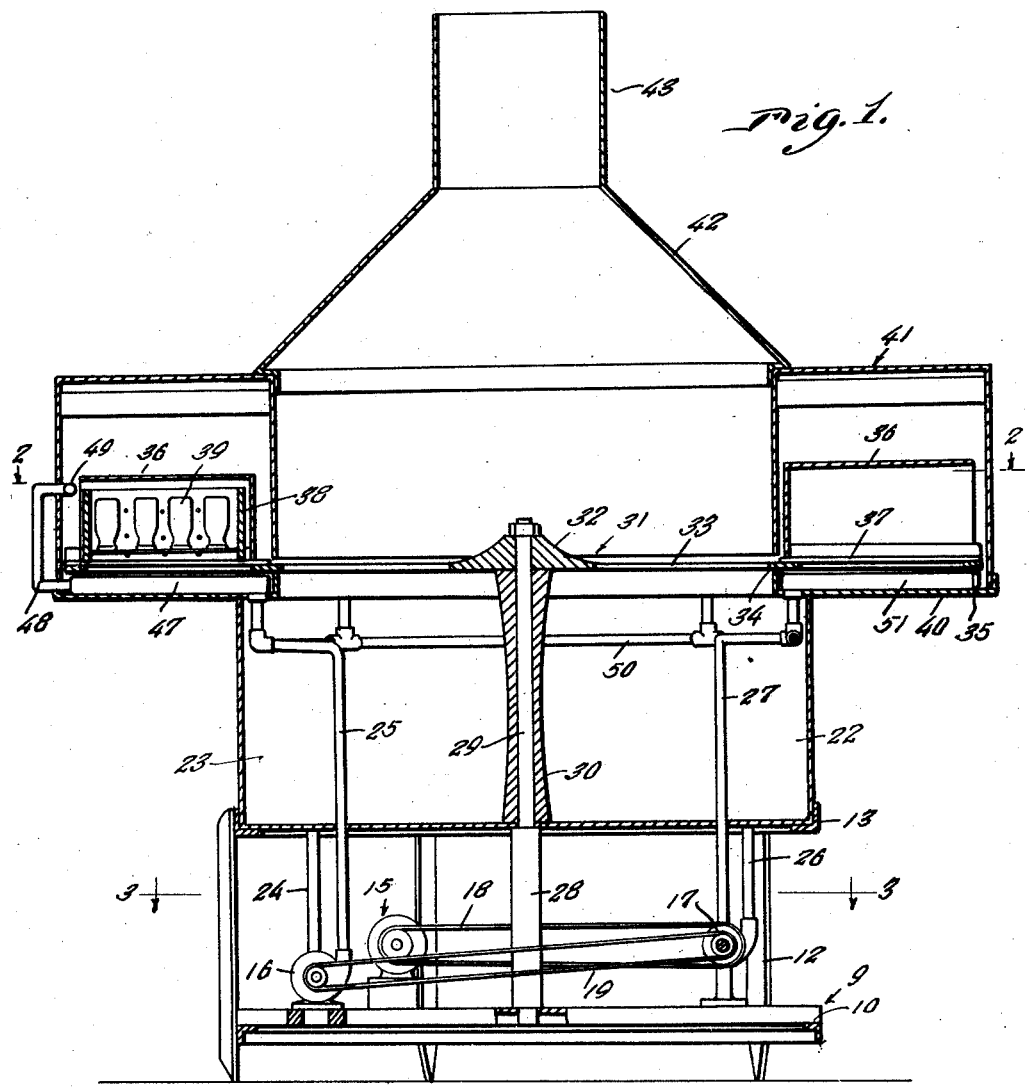
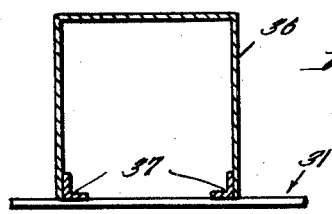
Inventor
John Newsome
By Clarence A. O'Brien
Attorney May 23, 1933.  J. NEWSOME  1,910,931
BOTTLE CLEANSING AND WASHING MACHINE
Filed Feb. 18, 1932  3 Sheets-Sheet 2
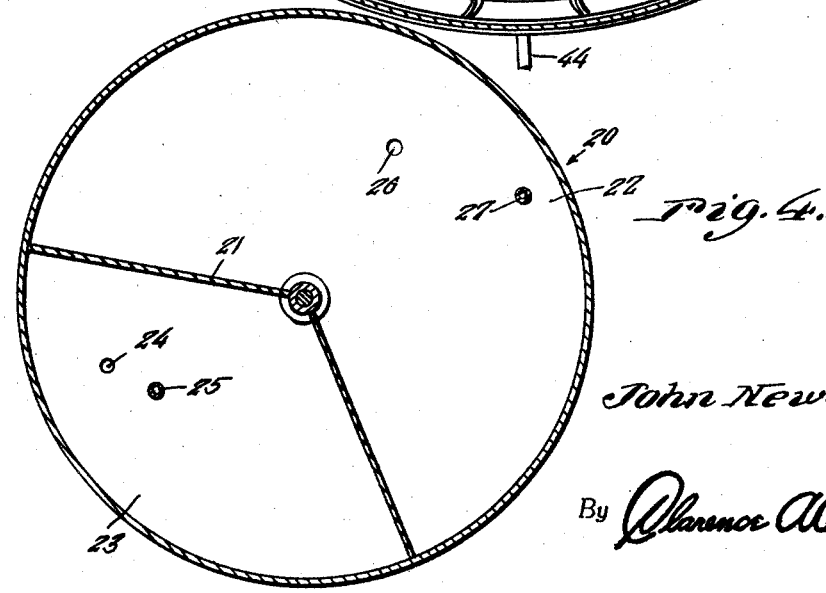

May 23, 1933. J. NEWSOME 1,910,931
BOTTLE CLEANSING AND WASHING MACHINE
Filed Feb. 18, 1932 3 Sheets-Sheet 3
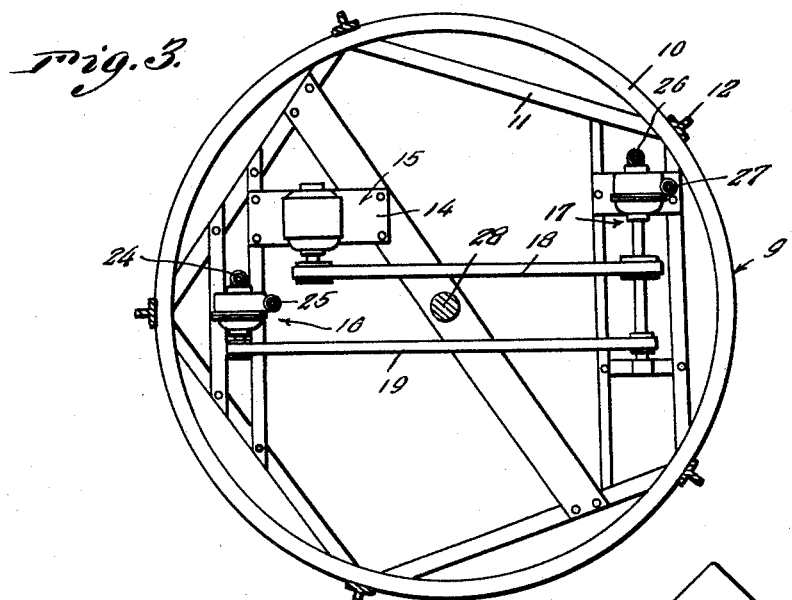
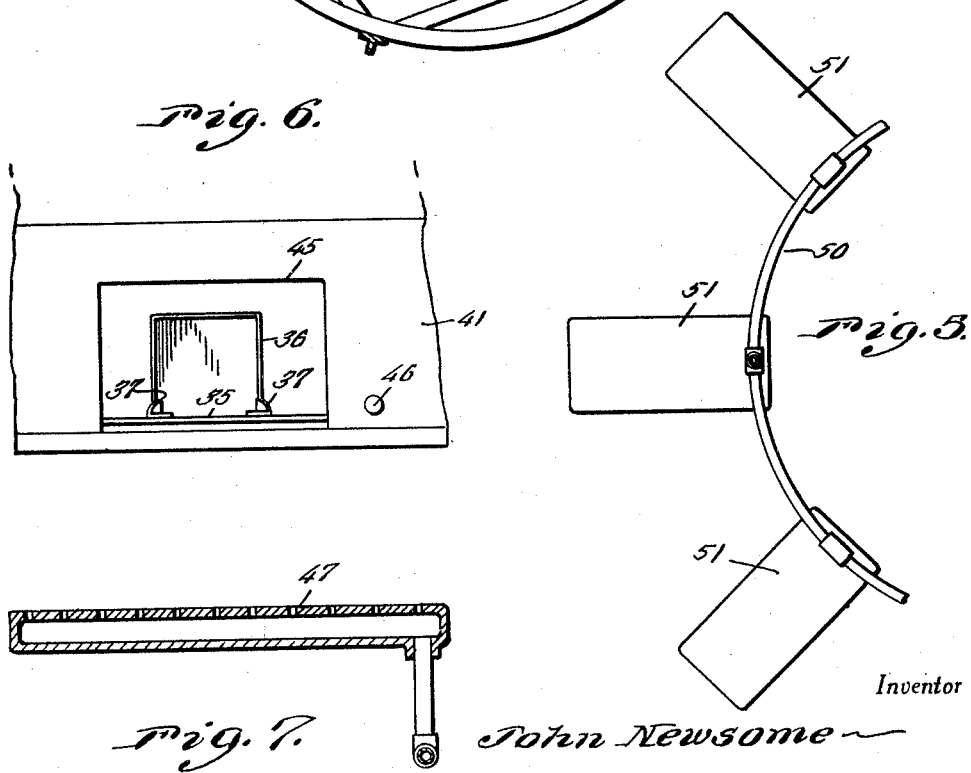
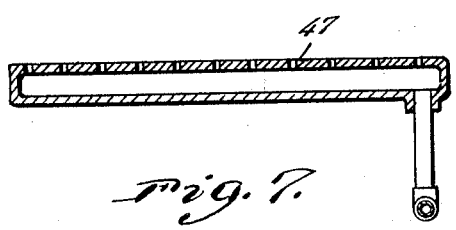
Inventor
John Newsome
By Clarence A. O'Brien
Attorney Patented May 23, 1933

1,910,931

UNITED STATES PATENT OFFICE

JOHN NEWSOME, OF SAVANNAH, GEORGIA

BOTTLE CLEANSING AND WASHING MACHINE

Application filed February 18, 1932. Serial No. 593,845.

This invention relates to a machine which is especially, but not necessarily, adapted for use in a dairy or similar establishment, said machine being constructed for cleansing, washing and partly drying milk bottles.

The fundamental idea of the invention is to provide a novel structural organization of especially selected and mechanically co-ordinated parts systematically arranged for expeditiously handling milk bottles while in the crate, whereby to minimize labor and expedite the task of thoroughly washing and treating milk bottles.

Particularly do I wish to emphasize the arrangement and specific construction whereby a number of bottle filled crates may be successively placed in the machine, thoroughly cleansed, rinsed, and partly dried in an easy and successful manner.

Another feature and advantage is predicated upon the simplified and economical construction and arrangement of piping and motor driven pumps for the solution treatment and the particular construction of the enclosure for conserving the solution and retrieving said solution to be used over and over again for sake of economy.

In the drawings:

Figure 1 is a view in section and elevation illustrating the complete structural arrangement and showing the particular construction and co-operation of the parts as designed in accordance with the present invention.

Figure 2 is a horizontal section taken approximately on the plane of the line 2—2 of Figure 1.

Figure 3 is a horizontal section on the line 3—3 of Figure 1.

Figure 4 is a horizontal section through the solution container and supply tank.

Figure 5 is a fragmentary bottom plan of a part of the caustic solution circulating and distributing unit.

Figure 6 is a fragmentary view showing the entrance and exit openings used in placing and removing the crates.

Figure 7 is a longitudinal section through one of the distributing heads.

Figure 8 is a detail section on the crate receiving box.

The support comprises a stand generally designated by the numeral 9 and including a base ring 10 provided with appropriately arranged braces 11. The numerals 12 designate uprights or legs which connect with the lower ring 12 and also with an upper annulus 13. Mounted on suitable bars in the lower ring 10 is a plate 14 which carries the electric motor 15 driving the circulation pumps 17 and 16 respectively.

The pumps and motor are joined in operative relationship through the medium of power propulsion belts 18 and 19 respectively.

I now call attention to the numeral 20 which designates a tank seated in the annulus 13 and provided with a partition 21 which defines a relatively large caustic solution compartment 22 and a rinsing water compartment 23. The latter compartment is somewhat smaller than the first-named compartment 22.

The rinsing water intake pipe 24 of the pump 16 is connected with the compartment 23 while the elevating pipe 25 leading from the periphery of the same pump extends up through the tank to the desired elevation for a purpose to be hereinafter described. Likewise the cleansing solution intake pipe of the pump 17 is indicated by the numeral 26 while the companion elevating pipe is denoted by the numeral 27.

The numeral 28 in Figure 1 designates a standard rising from the center of the base extending up through the tank and having its upper end reduced as indicated at 29 to accommodate a surrounding sleeve 30 forming a bearing post. This arrangement provides suitable mounting for the rotary bottle crate area 31.

As seen in Figures 1 and 2, the carrier has a central top or head 32 resting on the post and rotatably connected thereto and further includes radial spokes 33 connected with inner and outer rings 34 and 35 respectively. These rings form suitable supports for box-like receptacles or chests 36, and as seen in Figure 8 each chest is provided in its open bottom with spaced parallel tracks 37 which serve to receive and support the crate 38. Incidently the bottles are denoted by the numerals 39 and in practice these are inverted, that is, placed upside down in the crate before the crate is slipped into the box-like casing or chest 36.

The crates in the boxes move around over a trapping and solution return pan 40. The pan is annular in configuration and has a short rim and the overflowing fluid drips back over the inner rim into the respective compartments of the tank. In other words, the different solutions are returned to their respective compartments after being used.

It is understood that the tank and pan are stationary while the carrier 31 alone is mounted for rotation. Another stationary part is denoted by the numeral 41, this being a casing which fits down into the pan and entirely encloses the crate and receptacles 36 and outer peripheral portion of the area. Then too, the numeral 42 designates a sort of canopy having a stack 43 through which vapor and steam are allowed to escape into the atmosphere.

The numeral 44 in Figure 2 designates a hot air or dry steam pipe which is connected with the casing at a point near the entrance opening 45 (see Figure 6). It is through this opening 45 that the crates are placed in and removed. At this particular point there is a retaining latch 46 constructed to register with retaining sockets in the outer ring of the rotary carrier so that the carrier can be stopped in a step-by-step manner to bring it into registry with the opening 45.

The aforesaid rinsing solution elevating pipe 25 is connected with one or more horizontally disposed radially arranged distributing heads 47, the head being arranged in the pan and being provided at its outer end with upstanding U-shaped pipes 48 connected with a spray nozzle 49 arranged to spray the solution into the crate and over the bottles contained therein.

Each head 47 is provided with a multiplicity of orifices or ports which are located beneath the open mouth of the bottles so that the bottles are washed inside and outside.

The cleansing solution pipe 27 is connected with a segmental horizontal circulating pipe 50 which in turn has branch connections with the distributing heads 51 of which there are four or five as shown in Figure 2, these being located in the various box-like receptacles 36 around the circumference of the machine.

It is evident from the description and drawings that the bottle filled crates are placed on the rotary rack or carrier and successively subjected to the action of the different fluids for effective cleaning, rinsing and partial drying. Any number of different distributing heads and pipe arrangements may be provided depending on the results desired.

In practice, the rack-like carrier is designed to be revolved in a counterclockwise direction by the operator who extends his hand through the entrance opening 45 into engagement with the carrier 31. Thus the empty receptacle 36 is brought into registry with the entrance opening 45 as shown in Figure 6. Then the latch 46 is shoved in to hold the rack temporarily while placing the crate in position. Before the crate is inserted, the bottles are turned upside down. This brings the bottle neck over the discharge opening in the underlying distributing head 47 when the carrier moves one step to the right.

The first four or five distributing heads 51 are intended to spray the bottles forcibly with a caustic cleansing solution. Thus as the crates are placed in position one-by-one, the bottles therein are subjected successively to the action of certain solutions. At a predetermined point in the rotation of the carriage, the bottles come over the heads 47 which subject the bottles to a rinsing action from clear water. At the same time the rinsing water is sprayed from the nozzle 49 by way of the short pipe 48.

As each crate approaches the final step in the operation, it is brought into registry with a hot air or dry steam pipe 44 at which time the bottles are partly dried by relieving them of surplus water. The carriage is rotated and controlled by hand and through the medium of the retaining latch so that the period of stoppage and successive cleaning and rinsing step may be controlled according to the discretion of the operator.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A bottle washer comprising a stationary stand, an open topped tank supported on said stand, an annular pan supported above the open top of said tank, a plurality of circumferentially spaced radially disposed hollow apertured castings arranged in the pan, the apertures being in the upper sides thereof and permitting said castings to serve as distributing heads, motor driven pumps on said stand, each of said pumps having its intake connected with a source of liquid supply, circulating pipes connecting said pumps and said distributing heads, a rotary carrier rack supported on said stand, having its outer marginal portion of openwork form and overlying the pan, a plurality of circumferentially spaced receptacles on the outer marginal portion of the carrier, open at their lower ends and outer ends and adapted to move successively into registration with the underlying distributing head, a casing extending over the pan, receptacles and distributing head, said casing having an entrance opening at a predetermined point, and co-acting retaining means between the casing and carrier, said carrier being turned progressively for inserting and removing bottle-filled crates and subjecting the bottles in said crates to the action of fluid ejecting from said distributing heads.

In testimony whereof I affix my signature.

JOHN NEWSOME.